(12) United States Patent
Venkatesh et al.

(10) Patent No.: US 6,256,637 B1
(45) Date of Patent: Jul. 3, 2001

(54) TRANSACTIONAL VIRTUAL MACHINE ARCHITECTURE

(75) Inventors: Ramachandran Venkatesh, Hillsboro; Allen J. Otis, Beaverton; Robert F. Bretl, Portland, all of OR (US)

(73) Assignee: Gemstone Systems, Inc., Beaverton, OR (US)

( * ) Notice: Subject to any disclaimer, the term of this patent is extended or adjusted under 35 U.S.C. 154(b) by 0 days.

(21) Appl. No.: 09/073,147

(22) Filed: May 5, 1998

(51) Int. Cl.[7] .................................................. G06F 17/30
(52) U.S. Cl. ................................................. 707/103; 709/1
(58) Field of Search ................................... 707/100, 101, 707/102, 103; 709/1, 4, 107

(56) References Cited

U.S. PATENT DOCUMENTS

| | | | |
|---|---|---|---|
| 4,792,895 | * | 12/1988 | Tallman .................................. 709/1 |
| 4,912,628 | * | 3/1990 | Briggs ..................................... 709/1 |
| 5,201,049 | * | 4/1993 | Shorter .................................... 709/1 |
| 5,692,193 | * | 11/1997 | Jagannathan et al. ............... 709/106 |
| 5,745,703 | * | 4/1998 | Cejtin et al. .......................... 709/238 |
| 5,765,157 | * | 6/1998 | Lindholm et al. ................... 707/101 |
| 5,835,705 | * | 11/1998 | Larsen et al. .......................... 714/47 |
| 5,918,053 | * | 6/1999 | Graham ................................ 395/704 |
| 5,946,487 | * | 8/1999 | Dangelo ................................ 395/705 |
| 5,996,026 | * | 11/1999 | Onodera et al. ......................... 710/3 |
| 6,003,050 | * | 12/1999 | Silver et al. .......................... 707/536 |
| 6,098,080 | * | 8/2000 | Endicott et al. ...................... 707/206 |

OTHER PUBLICATIONS

Elmasri, Ramez; Fundamental of DB System; Library of Congress Cataloging in Publication Data; pp. 3–4, 1994.*

* cited by examiner

Primary Examiner—Hosain T. Alam
Assistant Examiner—Jean Bolte Fleurantin
(74) Attorney, Agent, or Firm—Ipsolon LLP

(57) ABSTRACT

A virtual machine computer includes multiple threads and can support multiple simultaneous workspaces. Within each workspace, multiple threads are able to access objects simultaneously. Threads are orthogonal to workspaces so that threads are not locked to particular workspaces, workspaces are not locked to particular threads, and the sizes of the workspaces are configurable to the requirements of the transactions within the workspaces. Such a virtual machine may be utilized in a variety of applications including transactional database applications in which multiple users have access to information (e.g., objects) in one or more shared databases. Such applications typically require that data transactions involving the objects in the shared database be performed reliably so as to maintain the integrity of the objects, which are sometimes called persistent objects.

14 Claims, 13 Drawing Sheets

TRANSACTIONAL VIRTUAL MACHINE ARCHITECTURE

FIELD OF THE INVENTION

The present invention relates to server virtual machines and, in particular, to a server virtual machine that simultaneously supports multiple workspaces.

BACKGROUND AND SUMMARY OF THE INVENTION

In computer systems, a virtual machine is software that mimics the performance of a hardware device. One example of a virtual machine is a program that allows applications written for x86 format microprocessor (e.g., available from Intel Corporation) to be run on a 68000 format microprocessor (e.g., available from Motorola Corporation). Virtual machine computers, referred to simply as virtual machines hereafter, have been developed recently to provide software that mimics a "complete" computer. One example is the Java™ virtual machine introduced by Sun Microsystems, Inc. and available for a variety of computer platforms to run programs written in the Java™ virtual machine-based programming language. Such a virtual machine functions as a computer platform that hides the operating system of the underlying hardware computer from applets and applications written in the programming language of the virtual machine.

Virtual machines are commonly associated with stand-alone or client-side computers where the virtual machine operates in conjunction with an operating system or an Internet browser, for example. It will be appreciated, however, that virtual machines may also be operated in conjunction with or on a server computer that serves one or more client computers. The clients may be connected to the server directly or by networked connections. One example of a server virtual machine is the Gemstone/J™ 1.0 server virtual machine available from Gemstone Systems, Inc. of Beaverton, Oreg., the assignee of the present invention. Server virtual machines may be used in a variety of applications, including database and transaction applications.

A common characteristic of servers and server applications is concurrent execution of client services on behalf of multiple clients within a single server or server application. While multi-threaded server operating systems and server applications are well known and widely available, server virtual machines are commonly restricted to executing only one workspace at a time. Client virtual machines have the same characteristic. One way in which such a conventional server virtual machine serves its multiple clients is to multiplex multiple client services or transactions onto a single workspace. This results in relatively slow execution of each of the services or deferred execution for selected ones of them. Another way in which such a conventional server virtual machine serves its multiple clients is to launch and run a transactional virtual machine with a workspace for each client service. This results in excessive system memory and processing resources and hence can limit the number of client services that can be provided simultaneously or decrease the speed at which the services are executed.

The present invention includes a virtual machine server that operates in a multi-threaded computer system and selectively launches and operates one or more server virtual machines. Each virtual machine includes multiple threads and can support multiple simultaneous workspaces. Within each workspace, multiple threads are able to access objects simultaneously. Moreover, threads are orthogonal to workspaces so that threads are not locked to particular workspaces, workspaces are not locked to particular threads, and the sizes of the workspaces are configurable to the requirements of the transactions within the workspaces. As a result, virtual machines according to this invention require less system memory and processing resources and hence can serve greater numbers of client services at greater speed than can conventional server virtual machines.

Virtual machines that support multiple workspaces may be utilized in a variety of applications including transactional database applications in which multiple users have access to information (e.g., objects) in one or more shared databases. Such applications typically require that data transactions involving the objects in the shared database be performed reliably so as to maintain the integrity of the objects, which are sometimes called persistent objects.

As another aspect of this invention, multiple temporary objects or views of a persistent object can be open and manipulated simultaneously by different users within different workspaces while the integrity of the persistent objects and the reliability of transactions involving them are maintained. The ability to support multiple simultaneous temporary objects or views of persistent objects is an analog to providing virtual machines that support multiple workspaces. In one implementation, transactional information in the form of a transactional information data structure identifies the object views or temporary objects within a workspace by workspace identifiers, as well as other aspects of the temporary objects. A persistent object transaction method, in the form of a sequence of virtual machine instructions, performs transactions on persistent objects in the virtual machine environment.

Additional objects and advantages of the present invention will be apparent from the detailed description of the preferred embodiment thereof, which proceeds with reference to the accompanying drawings.

DETAILED DESCRIPTION OF PREFERRED EMBODIMENT

Figure 1:
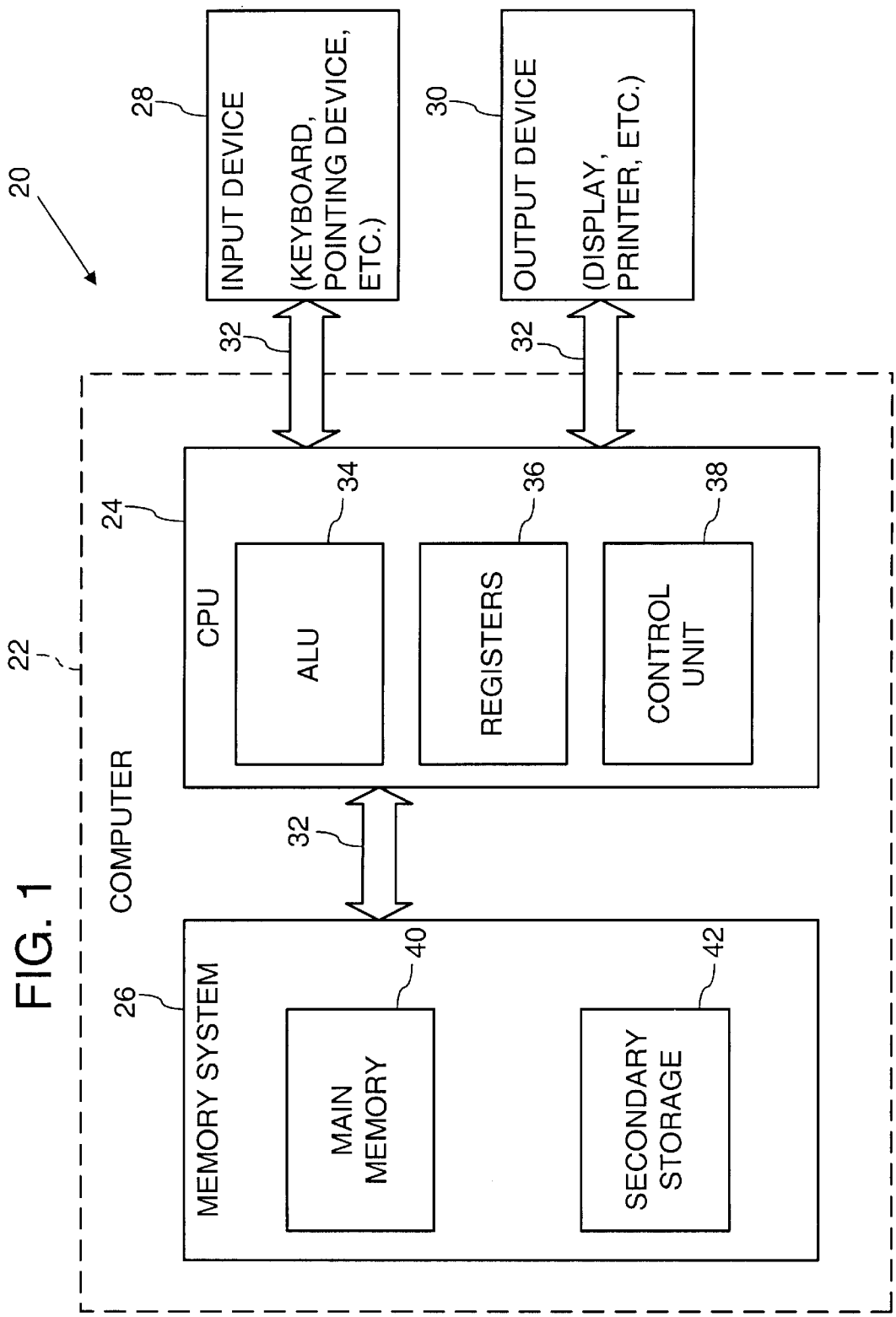
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
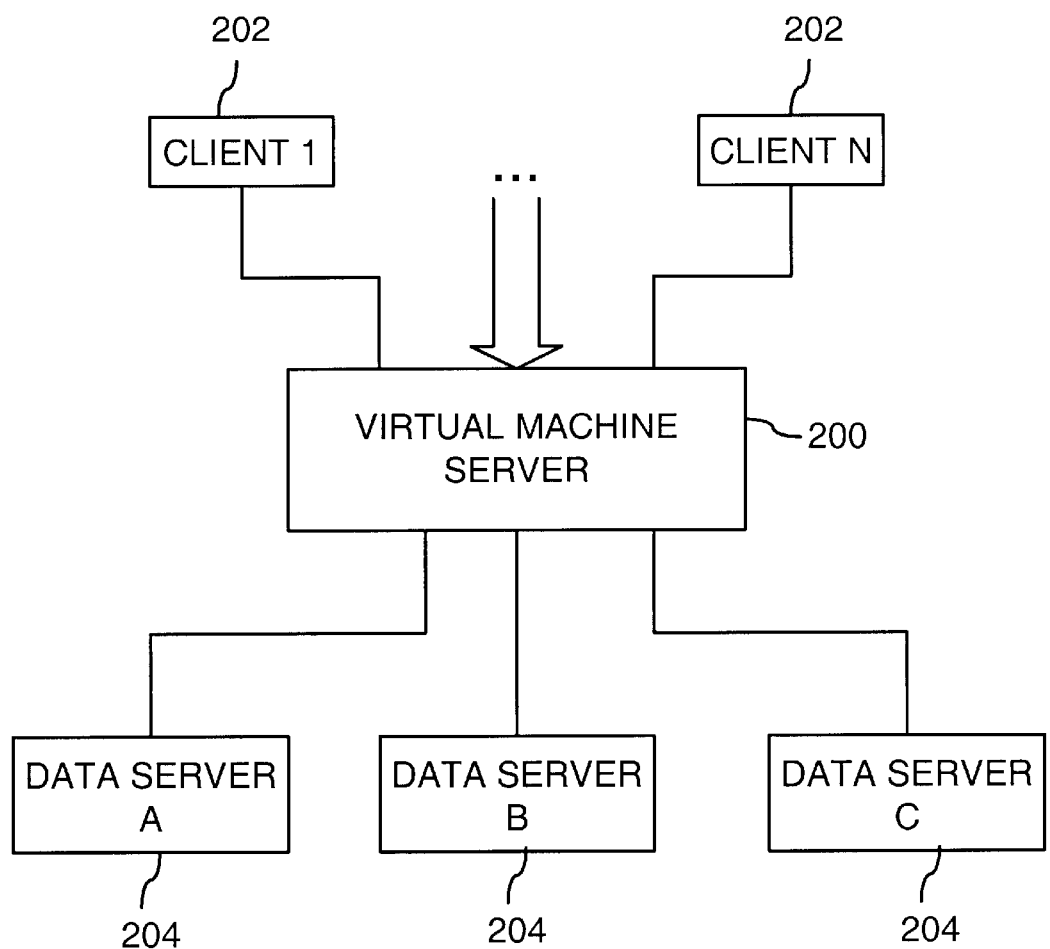
FIG. 2 is a block diagram showing an exemplary use of a virtual machine server according to the present invention in a three-tier system architecture for large-scale enterprise database and transaction computing.

FIG. 2 is a block diagram showing an exemplary use of a virtual machine server 200 according to the present invention in a three-tier system architecture for distributed database and transaction computing. It will be appreciated that this implementation of virtual machine server 200 is exemplary and does not limit the applications in which virtual machine server 200 may be used. In this illustration, a client layer represented by any number of multiple clients 202 handles user interface actions and local processing involving small amounts of data. A middle application server layer represented by one or more virtual machine servers 200 (only one shown) that handle information, in the form of objects, including sharing of objects between clients and executing methods on the objects. A data server layer represented by one or more data servers 204 handles storage and retrieval of data, including relational database access. In large-scale enterprise computing this architecture can support hundreds or thousands of clients 202 and many millions of objects.

In a transactional database environment, each client 202 retrieves information (objects) from and stores information (objects) to one or more shared databases on data servers 204. An expectation of such an environment is that it must maintain the reliability of transactions and the integrity of the objects in the database. These expectations have been enumerated as requiring the transactional database environment to provide Atomic committal of transactions, Consistent views of objects, Isolation of changes to objects, and Durable committal of transactions, which is sometimes summarized by the acronym ACID.

As is known in the art, the atomic committal of transactions expectation requires that information or objects for a transaction be committed to persistent storage on an all-or-nothing basis. The consistent views of objects expectation requires that each of multiple users is provided a consistent view, as of the begin point of the transaction, of information or objects that have committed to persistent storage. The isolation of changes to objects expectation requires that changes made to temporary objects or information in one transaction are not visible to other transactions until the changes are committed. The durable committal of transactions expectation requires that objects committed to persistent storage remain durable (i.e., unchanged) until subsequent changes are committed. Durable commit means that once a successful commit status is returned to the user, the changes must survive subsequent operating system or power failures.

In this exemplary illustration, virtual machine server 200 provides one or more virtual machines for executing software based upon a virtual machine-based programming language such as Java™ programming language promulgated by Sun Microsystems, Inc. Clients 202 may be personal or network computers running a network browser, such as Navigator from Netscape Corporation or Internet Explorer from Microsoft Corporation, or a dedicated user interface written in the Java™ programming language, for example. In other cases, one or more of clients 202 may take the form of unattended personal or network computers that function as machine controllers in a factory. Clients 202 may communicate with virtual machine server 200 through any of a variety of formats or protocols that include, for example, TCP/IP, HTTP, and IIOP (the Internet Inter-ORB Protocol for CORBA objects). Virtual machine server 200 may communicate with data servers 204 through a database access interface such as JDBC (Java Database Connectivity).

Figure 3:
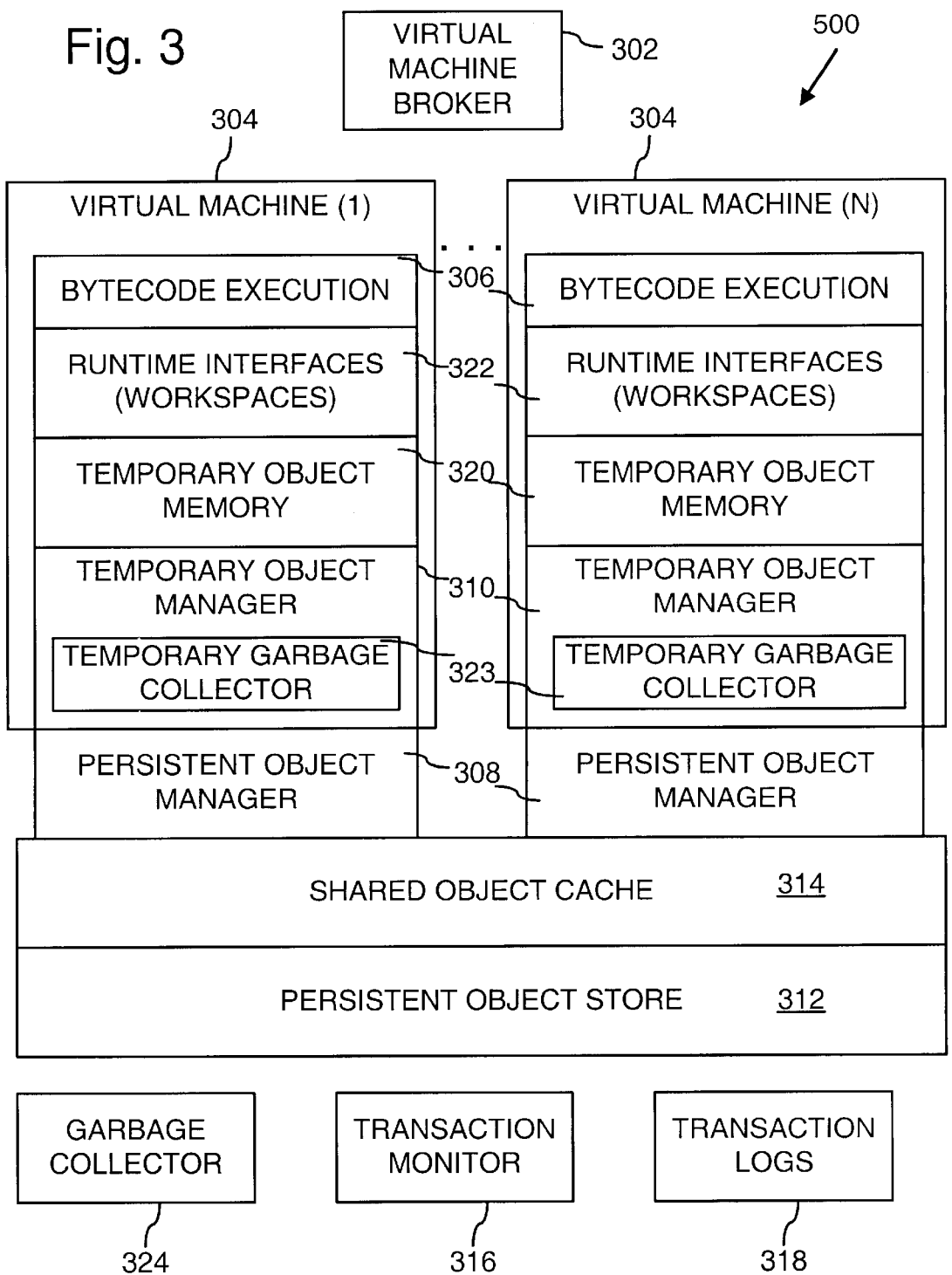
FIG. 3 is a block diagram illustrating the architecture of an exemplary virtual machine server.

FIG. 3 is a block diagram illustrating the architecture of exemplary virtual machine server 200. For purposes of illustrating details of virtual machine server 200, the following description is directed to an implementation for executing software based upon the Java™ virtual machine-based programming language. It will be appreciated, however, that the present invention is similarly applicable to other virtual machine-based programming languages.

A virtual machine broker 302 manages a pool of N-number of server virtual machines 304 that may be selectively activated and are simultaneously operable. Virtual machine broker 302 receives at a designated communication port (not shown) requests for client services sent from clients 202. Virtual machine broker 302 assigns the client services to virtual machines 304 and can start virtual machines 304 or terminate them according to the client services being requested. Virtual machine broker 302 may also enforce login authentication of clients 202 requesting client services. In this implementation, each virtual machine 304 runs software in the Java programming language.

Each virtual machine 304 includes a bytecode execution module 306 that executes Java language programs. Such programs were originally written in the Java language and have been compiled into bytecodes. As is known in Java language programming, bytecodes are binary, machine-independent representations of a program that represent the program using a stack-oriented instruction set. As part of executing the bytecodes, virtual machine 304 may execute the bytecodes with an interpreter or may translate some or all of the bytecodes to machine instructions native to the underlying computer. As is known in Java language programming, Java programs may include native methods, which are portions of the program written in a language other than Java (such as the C programming language) and separately compiled into machine instructions native to the underlying computer. As is known in the art of building a Java virtual machine, native methods can be used to provide access from the Java language to operations within the virtual machine not accessible from the bytecode instruction set.

A persistent object manager 308 and a temporary object manager 310 in each virtual machine 304 operate on persistent and temporary objects, respectively, within the virtual machine 304. Within a multi-user database or transaction computing system, information in the database is stored, retrieved, created, and deleted as objects. The objects are asynchronously created, retrieved, changed and dereferenced by multiple independent users. Object managers 308 and 310 manage these activities to maintain the integrity of persistent or permanent objects (i.e., objects that have been fixed or committed in the database for system-wide use) and the views that the multiple users have of the persistent objects. Object manager 310 provides users with new temporary objects and copies of persistent objects held in persistent object store 312. Object manager 308 locates persistent objects within object store 312 and can convert to persistent objects temporary objects passed from temporary object manger 310. In one implementation, the functionality of persistent object manager 308 and temporary object manager 310 are provided by an integrated object manager. The following description is directed to separate persistent and temporary object managers, but is similarly applicable to an integrated object manager.

With regard to persistent or permanent objects, persistent object manager 308 manages retrieval of objects from and storage of objects in a persistent object store 312 (i.e., disk I/O), memory page allocation for reading and writing persistent objects and caching them in a shared object cache 314 shared by all the virtual machines 304. Persistent object memory includes shared object cache 314 and the persistent object store 312. In addition, persistent object manager 308 communicates with a resource monitor 316 that manages shared resources (allocates persistent object identifiers, allocates memory blocks in persistent store) and enforces transaction integrity by recording changes to persistent objects in one or more transaction logs 318. Transaction logs 318 provide complete point-in-time roll-forward recovery.

With regard to temporary objects, temporary object manager 310 manages creation of temporary objects, creation of temporary copies of persistent objects in a temporary object memory 320 associated with multiple workspaces 322 for modification, deletion, or other manipulation by a user. Multiple workspaces 322 share a temporary object memory 320. All new and modified objects in the workspaces 322 are contained in the temporary object memory 320 until the transaction is committed. Within the context of a transactional database application, a workspace 322 is a database session that is initialized by a user beginning a transaction. The transaction execution continues by accessing through a graph or set of objects, sometimes called the working set, until the transaction is either committed to the database or the transaction is aborted. Objects read by different workspaces 322 may be held in shared object cache 314.

As is typical for Java language execution, each virtual machine 304 on virtual machine server 200 includes its own distinct temporary garbage collector 323, which is part of the temporary object manager 310. In this implementation, modified copies of persistent objects (sometimes referred to as "dirty" objects) are identified in a dirty object listing that is stored in temporary object memory 320 and lists all dirty objects and temporary objects within the workspace 322. Objects and temporary objects identified in the dirty object listing are protected from garbage collection until after the transaction involving the dirty objects is committed or aborted, as described below in greater detail. The dirty object listing is a well-known object that the garbage collector 323 includes as part of its "root set", using techniques well known in the art of building garbage collectors. The persistent object store includes a persistent garbage collector 324, which performs garbage collection of persistent objects in a manner that does not conflict with transaction processing.

Virtual machine server 200 operates in a multi-threaded computer system, and each virtual machine 304 includes multiple threads and can support multiple simultaneous workspaces 322. Within each workspace 322, multiple threads are able to access objects simultaneously. Moreover, threads are orthogonal to workspaces 322 so that threads are not locked to particular workspaces 322, workspaces 322 are not locked to particular threads, and the sizes of the workspaces 322 are configurable to the requirements of the transactions within the workspaces. In a virtual machine server 200 with fewer threads than workspaces 322, this allows threads to be used by one workspace 322 after another. These features of virtual machine 302 contrast with conventional server virtual machines that each have a single workspace that is tied to a single processing thread. As a result, virtual machines 302 require less system memory and processing resources and hence can serve greater numbers of client services at greater speed than can conventional server virtual machines.

It will be appreciated that multiple simultaneous workspaces and multiple simultaneous threads may be provided whether virtual machine 304 is operated on a computer having one or multiple CPUs 24. Such a concept of simultaneity of threads is a common construct. As is known in the art, however, the multiple simultaneous threads on a computer having only one CPU are actually time-multiplexed such that only one thread is actually being processed at a time. A computer having multiple CPUs may actually process as many threads simultaneously as there are CPUs.

Figure 4:
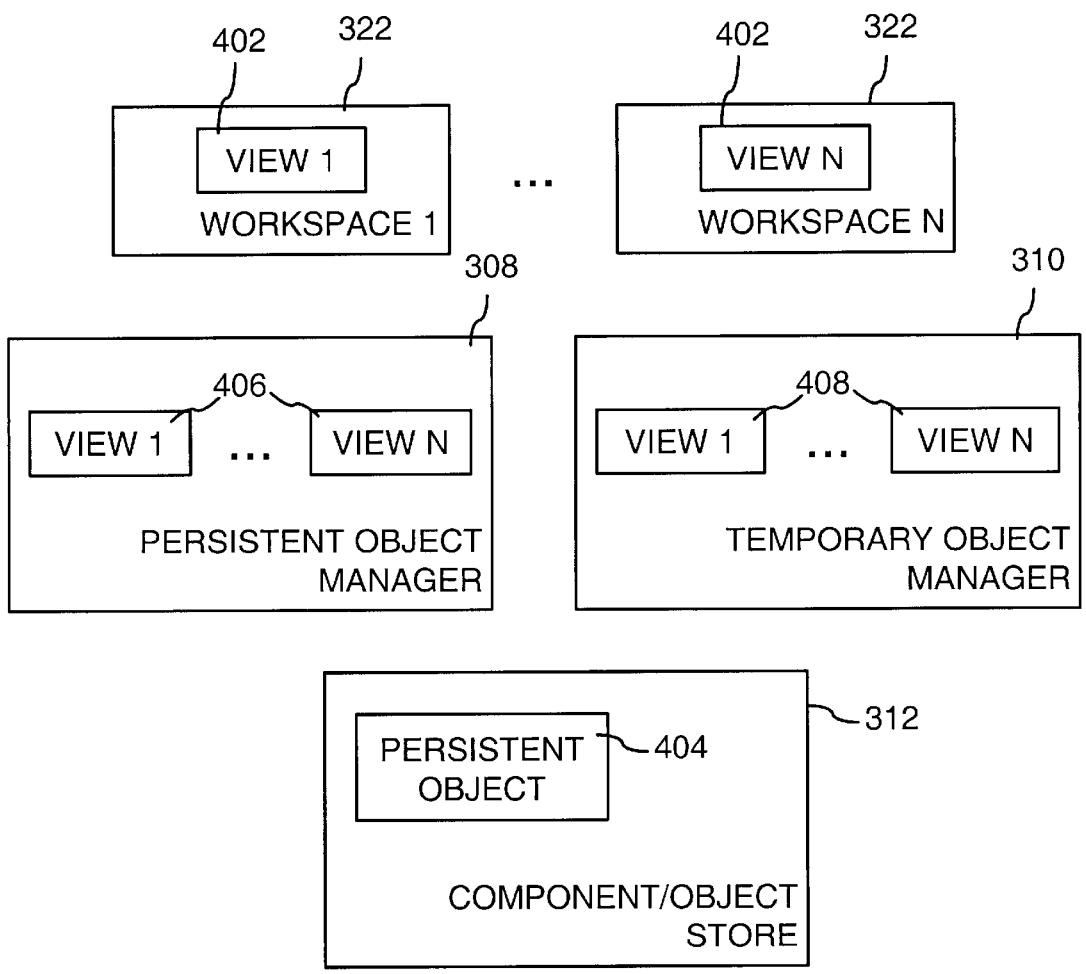
FIG. 4 illustrates multiple temporary objects or views of a persistent object open simultaneously within different workspaces of a server virtual machine.

FIG. 4 illustrates that as another aspect of this implementation multiple temporary objects or views 402 of a persistent object 404 can be open and manipulated simultaneously by different users within different workspaces 322. The different workspaces 322 may be within one or more virtual machines 304 on virtual machine server 200. Persistent object 404 in its committed form is stored in persistent object store 312. As shown in FIG. 4, each of the multiple views or temporary objects 402 of persistent object 404 resides in one of the multiple workspaces 322 of a virtual machine 304.

Persistent object manager 308 and temporary object manager 310 include transactional information 406 and 408, respectively, that identify the views 402. Transactional information 406 and 408 is used to maintain the transaction integrity of persistent object 404 despite potential uncertainties arising from the multiple views. In one implementation, transactional information 406 and 408 identify views 402 by workspace identifiers that identify the particular workspaces 322 in which the views are open, as described below in greater detail.

Figure 5:
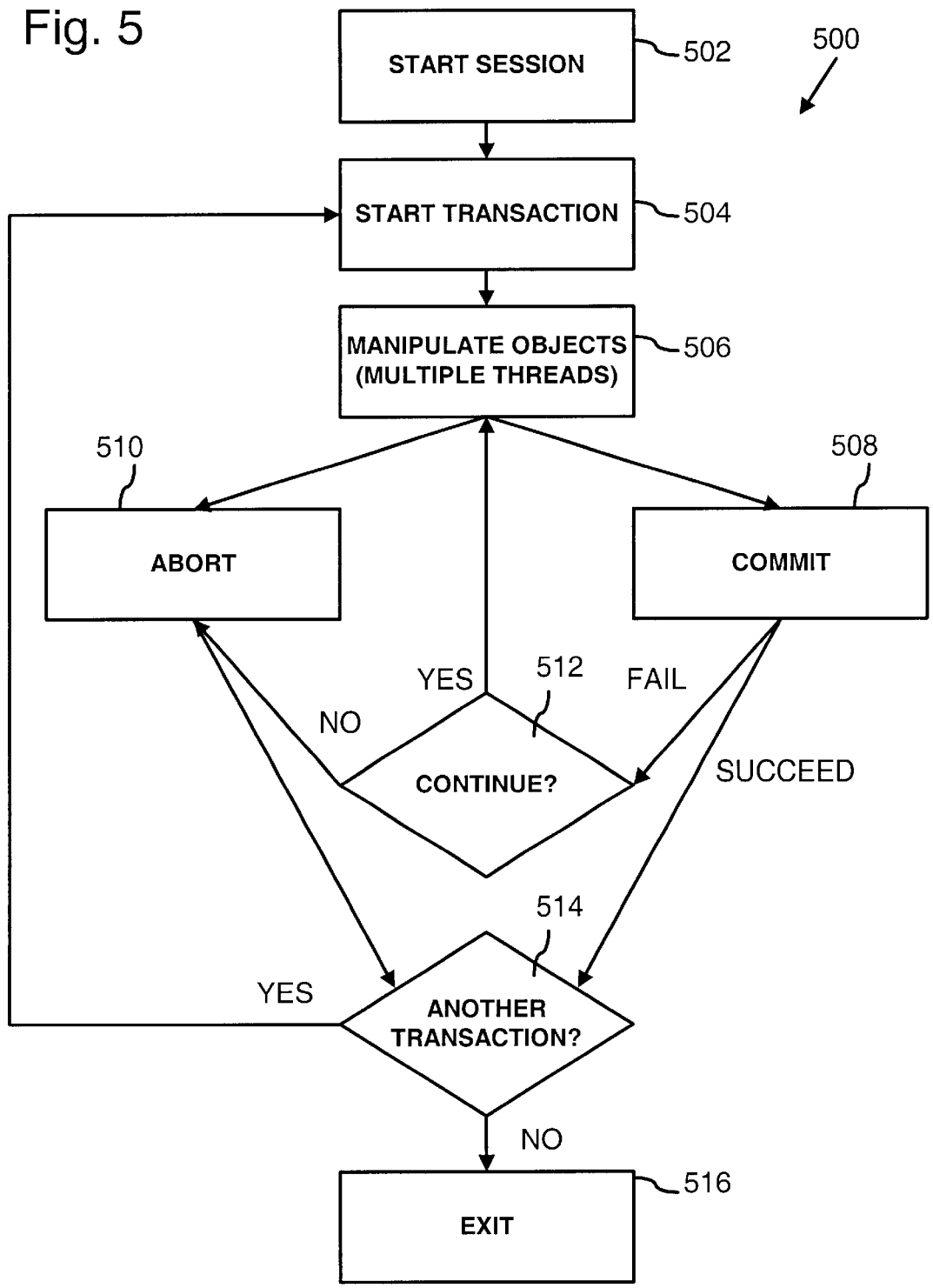
FIG. 5 is a flow diagram of a persistent object transaction method for performing a transaction on a persistent object in a virtual machine environment.

FIG. 5 is a flow diagram of a persistent object transaction method 500 for performing a transaction on a persistent object in a virtual machine environment. Transaction method 500 illustrates the operation of one of the multiple simultaneous workspaces that may be utilized and supported within a virtual machine (e.g., workspaces 322 within virtual machine 304). Different ones of these workspaces may have different simultaneous temporary objects or views 402 of a persistent object 404 while maintaining the transaction integrity for the transaction in each workspace. In this implementation, each workspace 322 may contain only one view 402 of a particular persistent object 404.

Process block 502 indicates that a transaction session is started when, for example, a user logs into the virtual machine. The start of the transaction session includes the allocation of a workspace 322 for the session.

Process block 504 indicates that a new transaction is started by initializing the workspace for the transaction. Workspace initialization includes initializing: a working set for identifying persistent objects that are copied into the workspace, a dirty object list for listing modified objects in the workspace, and a persistent object identifier mapping table for correlating persistent object identifiers with corresponding temporary object identifiers.

Process block 506 indicates that temporary objects within the workspace 322 are manipulated in the course of the transaction. For example, one or more of the temporary objects in workspace 322 may be accessed, created, or modified. The temporary objects may be newly created temporary objects or temporary views or copies (i.e., temporary objects) of persistent objects held in persistent object store 312. For example, object manager 310 may provide the new temporary objects and temporary object copies of persistent objects held in persistent object store 312. The result of these object manipulations embodies the transaction. The manipulation of the temporary objects within the workspace may employ one or more threads that are able to access objects simultaneously. Moreover, the threads are orthogonal to the workspaces so that the threads are not locked to particular workspaces and the workspaces are not locked to particular threads. As is known in the art of Java programming, programs using multiple threads within block 506 may need to be written using "synchronized" methods which get and release locks on objects to safely access them. The manipulation of the temporary objects is described in greater detail below with reference to FIG. 6. Process block 506 proceeds to process block 508 or process block 510 according to whether the transaction is to be committed or aborted, respectively. For example, a user may elect to commit or abort the transaction based upon a query made explicitly to the user or the user may elect to commit or abort the transaction without being prompted.

Process block 508 indicates that the transaction is committed. Committal of the transaction causes it to be recorded in persistent object store 312 as one or more new or modified persistent objects. Process block 508 proceeds to query block 512 if the committal fails and proceeds to query block 514 if the committal succeeds. Success and failure of the committal is described in greater detail below primarily with reference to FIG. 11.

Process block 510 indicates that the transaction is aborted. Aborting the transaction terminates it without changing the persistent objects that had been copied as temporary objects into the workspace from the persistent object store and without recording into the persistent object store any newly created temporary objects. The aborting of a transaction is described in greater detail below primarily with reference to FIG. 12. Process block 510 proceeds to process block 514.

Query block 512 represents an inquiry as to whether the transaction is to be continued or aborted. Whenever the transaction is to be continued, query block returns to process block 506. Whenever the transaction is to be aborted, query block returns to process block 510.

Query block 514 represents an inquiry as to whether another transaction is to be performed. For example, a user may elect to perform another transaction based upon a query made explicitly to the user or the user may elect to perform another transaction without being prompted. Whenever another transaction is to be performed, query block returns to process block 504. Whenever another transaction is not to be performed, query block proceeds to termination block 516, which terminates process 500.

Figure 6:
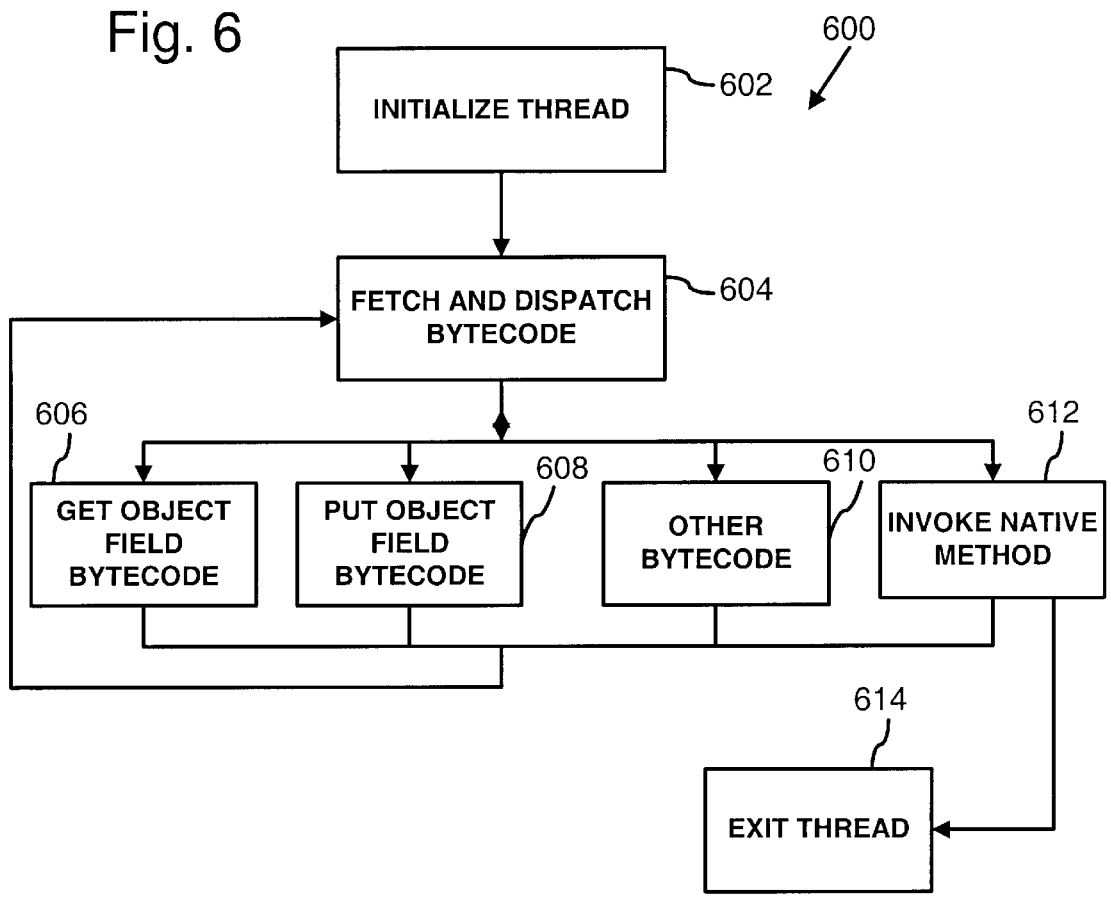
FIG. 6 is a flow diagram of a virtual machine object manipulation process for executing object manipulations along each of the one or more virtual machine threads in a workspace.

FIG. 6 is a flow diagram of a virtual machine object manipulation process 600 for executing object manipulations along each of the one or more virtual machine threads in a workspace 322 for process step 506. With the threads being orthogonal to the workspaces, different parts of a transaction in a workspace can be processed along different threads. Process 600 illustrates object executing object manipulations during a thread within process step 506. Conventional virtual machine thread processing may be employed for other steps in process 500. In this implementation, process 600 is performed within a bytecode execution module 306.

Process block 602 indicates that a thread is initialized. For example, a thread is initialized when a transaction is initialized according to process block 504 or when object manipulation resumes after a prior thread for a transaction has ended. Initialization entails allocating the thread for use in executing object manipulations. The initialized thread is one of multiple threads available within the virtual machine.

Process block 604 indicates that a virtual machine instruction (bytecode) is fetched from memory and dispatched for execution by the virtual machine according to whether the instruction is a get_object_field bytecode or a put object field bytecode, according to this implementation, some other bytecode (e.g., a standard Java virtual machine bytecode), or a bytecode to invoke a native method.

Process block 606 indicates that a get_object_field bytecode is executed. The get_object_field bytecode is similar to a conventional get_field bytecode, which in the standard Java virtual machine functions to fetch the value of a field. The get_object_field bytecode differs from the conventional get_field bytecode in that the former operates only on fields of type Object and performs transactional operations that maintain the reliability of transactions and the integrity of the objects in the database, as described below in greater with reference to FIG. 8. The latter operates on a field of any type (int, float, Object, etc) and does not perform the transactional operations described below. Process block 606 returns to process block 604.

Process block 608 indicates that a put_object_field bytecode is executed. The put object field bytecode is similar to a conventional put_field bytecode, which in the standard Java environment functions to pop a value off the execution stack and store it into a field of an object. The put_object_field bytecode differs from the conventional put_field bytecode in that the former operates only on fields of type Object and performs transactional operations that maintain the reliability of transactions and the integrity of the objects in the database, as described below in greater with reference to FIG. 10. The latter operates on a field of any type (int, float, Object, etc) and does not perform the transactional operations described below. Process block 608 returns to process block 604.

Process block 610 indicates that a bytecode other than a ge_object_field bytecode or a put_object_field bytecode (e.g., a standard Java virtual machine bytecode) is executed. Process block 910 returns to process block 604.

Process block 612 indicates that a native method is invoked. Process block 614 indicates that the virtual machine thread terminates. Typically, a virtual machine thread will terminate because of an exception or error condition or because the program is terminating parallel execution and returning to single threaded execution on another thread.

Figure 7:
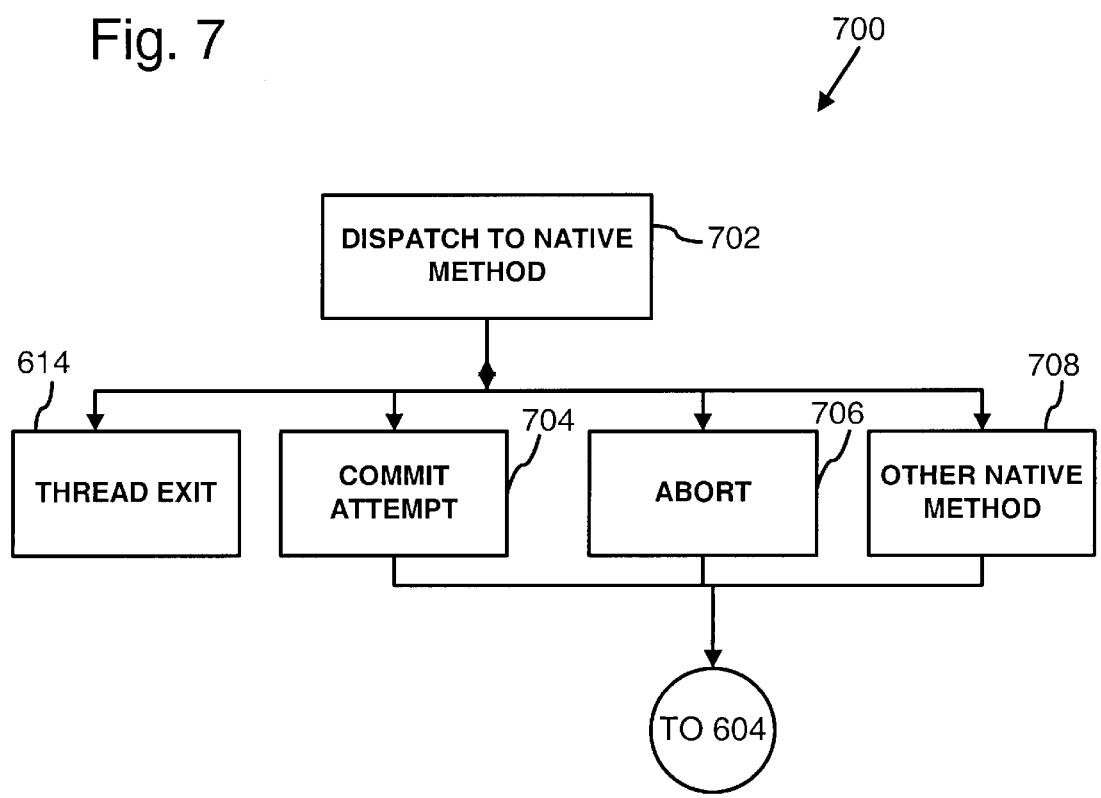
FIG. 7 is a flow diagram of a native method invocation process in which a native method in a virtual machine environment manipulates one or more objects in a transaction.

FIG. 7 is a flow diagram of a native method invocation process 700 in which a native method for manipulating one or objects in the transaction is executed.

Process block 702 indicates that an object manipulating native method is fetched from memory by the virtual machine and dispatched for execution according to whether the object manipulating native method is a commit attempt or abort, according to this implementation, some other native method, or a native method that exits the thread.

Process block 704 indicates that commit process 508 is executed as a native method, as described below in greater detail with reference to FIG. 11. Commit process step 508 is implemented as a native method so that it can access functions within the virtual machine, including calling functions in blocks 308 and 310 to perform the commit. Such functions are not directly accessible from the Java bytecode instruction set. Process block 704 returns to process block 604.

Process block 706 indicates that abort process 510 is executed as a native method, as described below in greater detail with reference to FIG. 12. Abort process step 510 is implemented as a native method for the same reasons that commit process step 508 is implemented as a native method. Process block 706 returns to process block 604.

Process block 708 indicates that another native method is executed.

Process block 614 indicates that a native method terminates the thread.

Figure 8:
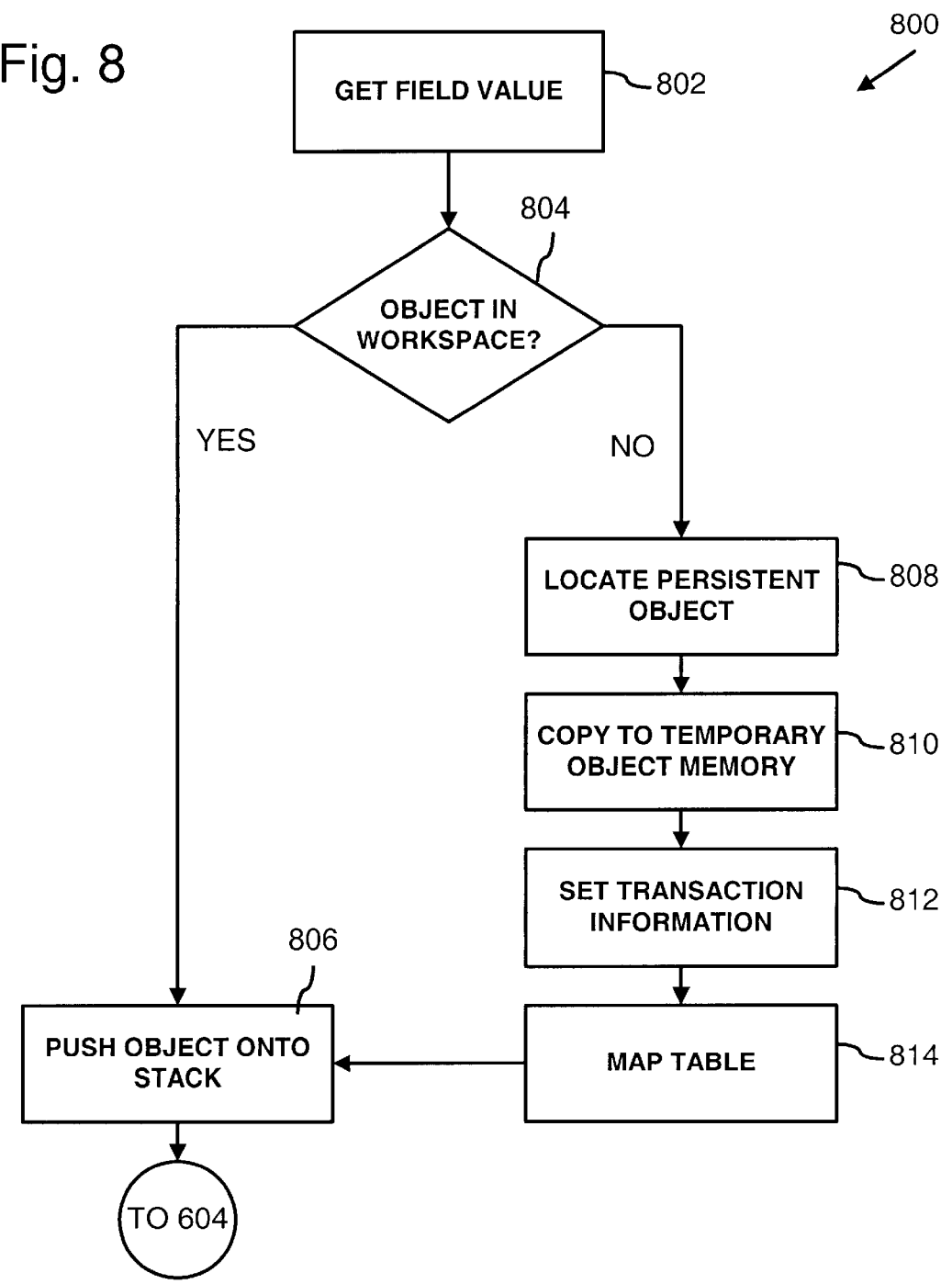
FIG. 8 is a flow diagram of a transactional object get process illustrating execution of a get_object_field bytecode that performs transactional operations that maintain the reliability of transactions and the integrity of the objects in the database.

FIG. 8 is a flow diagram of a transactional object get process 800 illustrating execution of the get_object_field bytecode, including performing transactional operations that maintain the reliability of transactions and the integrity of the objects in the database. As described with reference to process blocks 506 and 606, transactional object get process 800 is applied to temporary objects in the workspace 322. Each temporary object in the workspace 322 is uniquely identified by a temporary object identifier that is maintained by temporary object manager 310.

Process block 802 indicates that a field value is fetched from a selected field of a selected temporary object in the workspace. In one implementation the preconditions for get_object_field bytecode are that the top of stack is a temporary object identifier O and the bytecode encodes a field offset N. The value V of the field N in O is fetched from temporary object memory 320. Because get_object_field only operates on fields of type object, V is by definition an object identifier.

Query block 804 represents an inquiry as to whether the object specified by the requested field value V is in the workspace. In one implementation, if V is the identifier of a temporary object, the object is already in the workspace, and query block 804 proceeds to process block 806. If V is the identifier of a permanent object, the requested field value is not in the workspace, and query block 804 proceeds to process block 808.

Process block 806 indicates that the requested field value V, which is the identifier of a temporary object, is pushed onto the virtual machine stack for use by subsequent virtual machine instructions. Process block 806 proceeds to process block 604.

Process block 808 indicates that the persistent object 404 corresponding to the requested field value V is located in persistent object store 312 to be faulted or copied into temporary object memory 302. This step 808 and the following steps 810–814 are performed to fault the requested field value into temporary object memory 302 as a copy of the identified persistent object, as described below in greater detail.

Process block 810 indicates that a copy of the selected persistent object is made by copying the persistent object from persistent object store 312 into a newly created temporary object in temporary object memory 302.

Process block 812 indicates that transactional information is cached in temporary object memory 320 for the selected temporary object and in shared object cache 314 in association with the corresponding persistent object 404. Within temporary object memory 320, the transaction information may be incorporated into an object header or other data structure associated with the selected temporary object as shown in FIG. 9.

Figure 9:
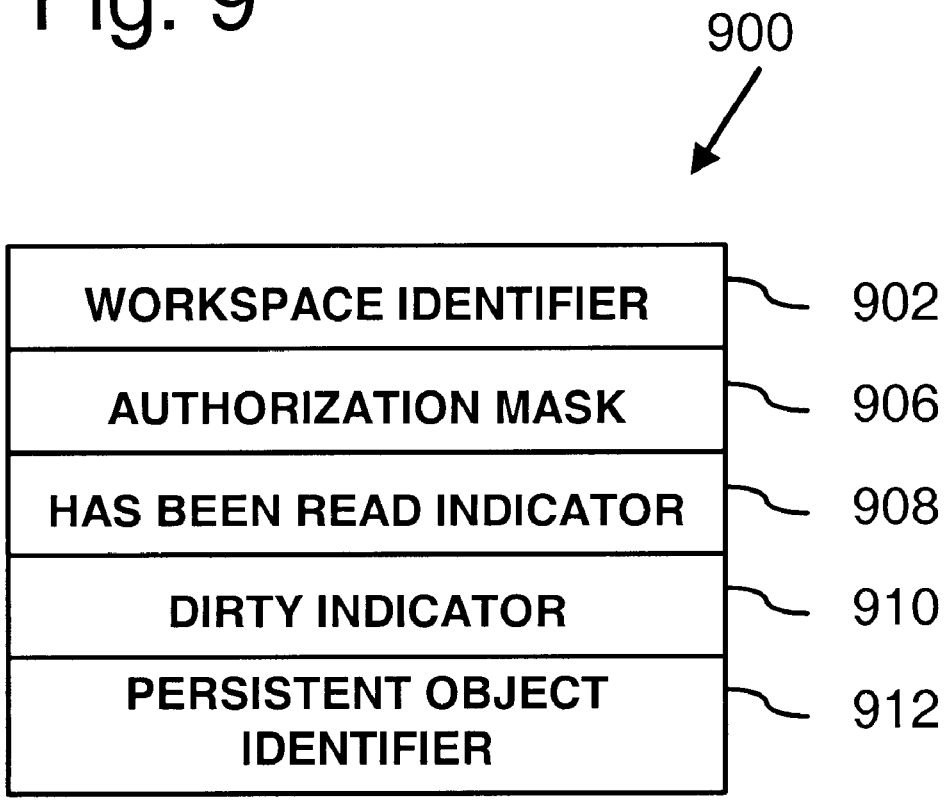
FIG. 9 illustrates an exemplary transaction information data structure.

FIG. 9 illustrates an exemplary transaction information data structure 900 associated with the selected temporary object. In this implementation, transactional information data structure 900 includes a workspace identifier 902 that identifies the particular workspace 322 where the selected temporary object is instantiated an authorization mask 906 that specifies the level of access available for the object, a "has been read" indicator 908 indicating whether the object has been read or copied from persistent object store 312 since the last commit or abort in that workspace, a modification or dirty indicator 910 indicating whether the selected temporary object of the object has been modified, and a persistent object identifier 912 that uniquely identifies the persistent object 404 of which the selected temporary object is a copy.

The workspace identifier 902 of the selected temporary object is inherited from, and hence the same as the workspace identifier 902 for, the object requesting the selected temporary object. This inheritance of workspace identifier 902 consistently designates the objects accessed within a selected workspace 322 independent of which thread accessed or faulted a particular temporary object. As a result, the workspace identifiers facilitate multiple simultaneous workspaces 322 within a virtual machine 304.

The following are examples of formats suitable for the transactional information data structure 900. The workspace identifier 902 may be represented by 8 bits to allow up to 255 different workspaces 322 (plus an invalid workspace) within a virtual machine 304. The authorization mask 906 may be represented by 2 bits, in which the value 0 indicates that no access to the object is available, the value 1 indicates that read access is available, and the value 3 indicates that write access to the object is available. (Write access includes read access.)

The "has been read" indicator 908 may be represented by one bit that is set to the value 1 when an temporary object or view of a persistent object has been read. The dirty indicator 910 may be represented by one bit that is set to the value 1 if the selected temporary object of the object has been modified. The persistent object identifier 912 may be represented by 32 bits to uniquely identify the object. Data structure 900 provides transactional information on a per object basis. Additional information on a per workspace basis are included in data structures referred to as a modified (i.e., dirty) object list or listing, a working set, a persistent object identifier mapping table which are data structures managed by persistent object manager 308 and temporary object manager 310.

A benefit of these exemplary formats for the transactional information is that they allow the information to be integrated in the object header. In a typical Java virtual machine, for example, each object in temporary object memory 320 includes a header characterized by one word including low level format and size information. Such object headers can be modified by addition of two 32-bit words, which is adequate for incorporation of transactional information data structure 900. Transactional information data structure 900, except sometimes persistent object identifier 912, is held in temporary object memory 320. Each persistent object identifier 912 is held in the permanent object memory, which includes persistent object store 312 and shared object cache 314.

Initial states for the components of data structure 900 for a temporary object copied or faulted from a persistent object 404 are as follows: workspace identifier 902 is set to the value of the workspace for the transaction, authorization mask 906 is set to read or write, has been read indicator 908 is set to true, dirty indicator 910 is set to false, and persistent object identifier 912 is set to the value of the persistent object 404. Initial states for the components of data structure 900 for a temporary object created within the workspace 322 are as follows: workspace identifier 902 is set to a value representing "undefined" (e.g., −1), authorization mask 906 is set to read and write, has been read indicator 908 is set to true, dirty indicator 910 is set to true, and persistent object identifier 912 is set to a value representing undefined.

Process block 814 indicates that the persistent object identifier 912 for the selected temporary object of the requested persistent object 404 is entered into a persistent object identifier mapping table. The persistent object identifier mapping table correlates the persistent object identifier 912 with a corresponding temporary object identifier that is used within bytecode execution module 306 to identify and reference the selected temporary object. In a typical Java virtual machine, for example, a temporary object identifier is a memory pointer to an object header and is correlated with the persistent object identifier 912 through a hash table, as is known in the art. In accordance with this implementation, workspace identifier 902 and persistent object identifier 912, as well as the other elements of data structure 900, are incorporated as additional fields in the temporary object header. Process block 814 returns to process block 806 where the temporary object identifier for the newly created copy of the persistent object is pushed on the virtual machine stack.

In one implementation of faulting a persistent object 404 into temporary object memory 302, the persistent object identifier 912 corresponding to the requested field value is sought in the persistent object identifier mapping table for the particular workspace (i.e., according to the workspace identifier 902). If the persistent object identifier 912 corresponding to the requested field value is not found in the persistent object identifier mapping table for the particular workspace, a temporary object is generated in the temporary object memory as a copy of the persistent object having the persistent object identifier value.

If the persistent object identifier 912 corresponding to the requested field value is found in the persistent object identifier mapping table for the particular workspace, the has been read indicator 908 for the temporary object is checked. If the has been read indicator 908 is true, the temporary object is deemed present and valid. If the has been read indicator 908 is false, the temporary object is deemed stale and is re-copied from the persistent store 312. In this manner, has been read indicator 908 provides an on-demand refresh of stale temporary objects that are based upon persistent objects, thereby providing greater performance by delaying until necessary the re-read of changed objects.

Figure 10A:
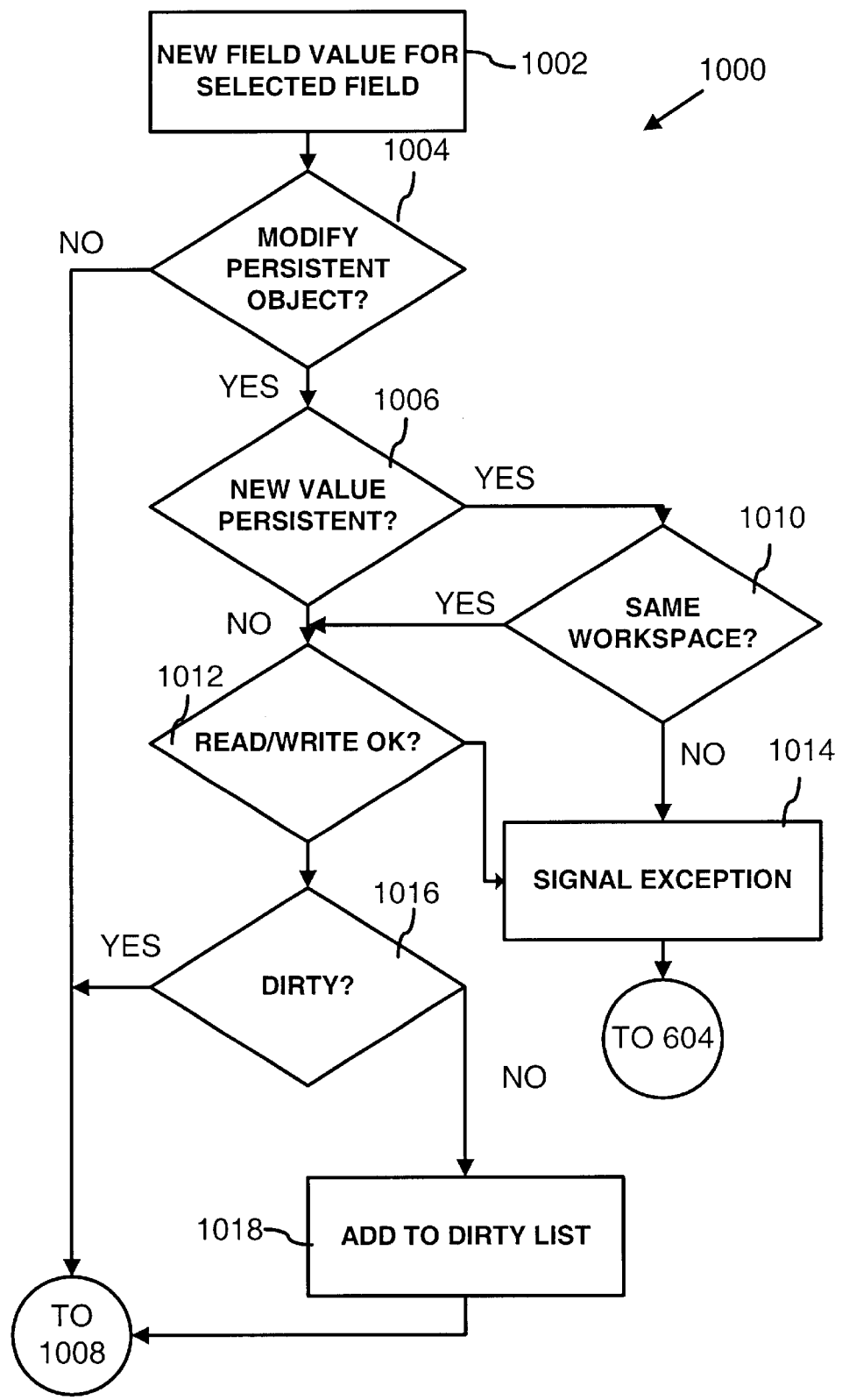
FIG. 10 is a flow diagram of a transactional object put process illustrating execution of a put_object_field bytecode that performs transactional operations that maintain the reliability of transactions and the integrity of the objects in the database.
Figure 10B:
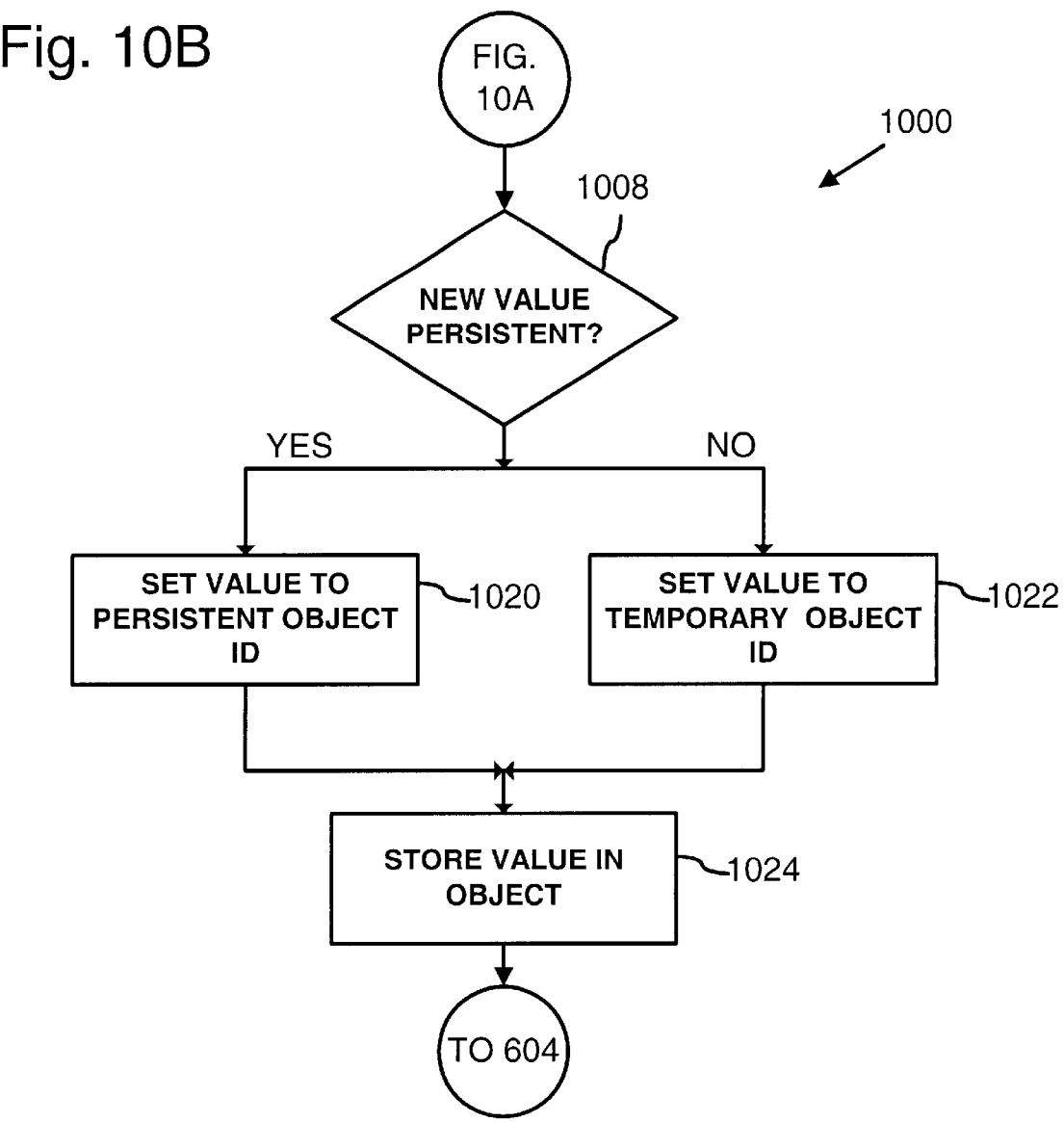

FIG. 10 is a flow diagram of a transactional object put process 1000 illustrating execution of the put_object_field bytecode, including performing transactional operations that maintain the reliability of transactions and the integrity of the objects in the database. The put_object_field bytecode enforces the requirement that workspace identifiers 602 match for the object being stored into and the value being stored, thus maintaining consistent a view for the transaction and also enforces write permission. As described with reference to process blocks 506 and 608, transactional object process 1000 is applied to temporary objects in the workspace 322. Each temporary object in the workspace 322 is uniquely identified by a temporary object identifier that is maintained by temporary object manager 310.

Process block 1002 indicates that a new field value is identified for a selected field of a selected temporary object that is to be modified with the new field value. In one implementation, the precondition for put_obj_field bytecode is that the identifier of a temporary object O is top-of-stack, next on stack is a new field value V (i.e., a temporary object identifier), and the bytecode encodes a field offset N that specifies a field in O.

Query block 1004 represents an inquiry as to whether the selected temporary object O to be modified is a copy of a persistent object. This inquiry may be implemented as an inquiry as to whether the persistent object identifier for the selected temporary object is the value representing undefined. Whenever the selected temporary object O to be modified is based upon a persistent object, query block 1004 proceeds to query block 1006. Whenever the selected temporary object O to be modified is not based upon a persistent object, query block 1004 proceeds to query block 1008.

Query block 1006 represents an inquiry as to whether the new field value V is based upon a persistent object. Whenever the new field value is based upon a persistent object, query block 1006 proceeds to query block 1010. Whenever the new field value is not based upon a persistent object, query block 1006 proceeds to query block 1012.

Query block 1010 represents an inquiry as to whether the new field value V and the selected temporary object O to be modified have the same workspace identifier value (e.g., O.Wksld=V.Wksid?). Whenever the new field value and the selected temporary object to be modified have the same workspace identifier value, query block 1010 proceeds to query lock 1012. Whenever the new field value and the selected temporary object to be modified do not have the same workspace identifier value, query block 1010 proceeds to process block 1014.

Process block 1014 indicates that an exception or error is signaled. The negative result of query block 1010 indicates that the new field value and the selected temporary object to be modified are assigned to different workspaces. Objects in different ones of the multiple workspaces 322 supported by the present invention cannot properly affect each other. The exception that is signaled by this step prevents such an error from occurring. Process block 1014 returns to process block 604.

Query block 1012 represents an inquiry as to whether the authorization mask 906 for the selected temporary object to be modified indicates that read or write operations are allowed (e.g., O.Auth=R/W?). (Write operations include read operations.) Whenever the authorization mask 906 indicates that read or write operations are not allowed, query block 1012 returns to process block 1014. Whenever the authorization mask 906 indicates that read or write operations are allowed, query block 1012 proceeds to query block 1016.

Query block 1016 represents an inquiry as to whether the dirty indicator 910 for the selected temporary object O to be modified indicates that it has already been modified (e.g., is O.dirty equal to true?). Whenever the dirty indicator 910 indicates that the selected temporary object has not been modified, query block 1016 proceeds to process block 1018. Whenever the dirty indicator 910 indicates that the selected temporary object has already been modified, query block 1016 proceeds to query block 1008.

Process block 1018 indicates that the dirty indicator for the selected temporary object is set to true (e.g., O.Dirty= true) and the temporary object identifier of the selected temporary object is added to the dirty list.

Query block 1008 represents an inquiry as to whether the new field value V is based upon a persistent object. Whenever the new field value is based upon a persistent object, query block 1008 proceeds to query block 1020. Whenever the new field value is not based upon a persistent object, query block 1008 proceeds to query block 1022.

Process block 1020 indicates that the new field value (designated val) is set to the persistent object identifier 912 of the persistent object 404 upon which the new field value is based (e.g., val=V.persistentOID).

Process block 1022 indicates that the new field value maintains its temporary object identifier (e.g., val=V).

Process block 1024 indicates that the new field value (val) is stored into the selected field N in the selected temporary object O to be modified. Process step 1020 supports automatic pruning by the garbage collector 323 by eliminating an otherwise extraneous reference to the temporary object identifier for the new field value. In particular, storing the persistent object identifier 912 of the persistent object 404 upon which the new field value is based (i.e., V.persitentOID) into the selected field of the selected temporary object allows the temporary object V, which is the new field value, to be eventually reclaimed by 323.

Figure 11:
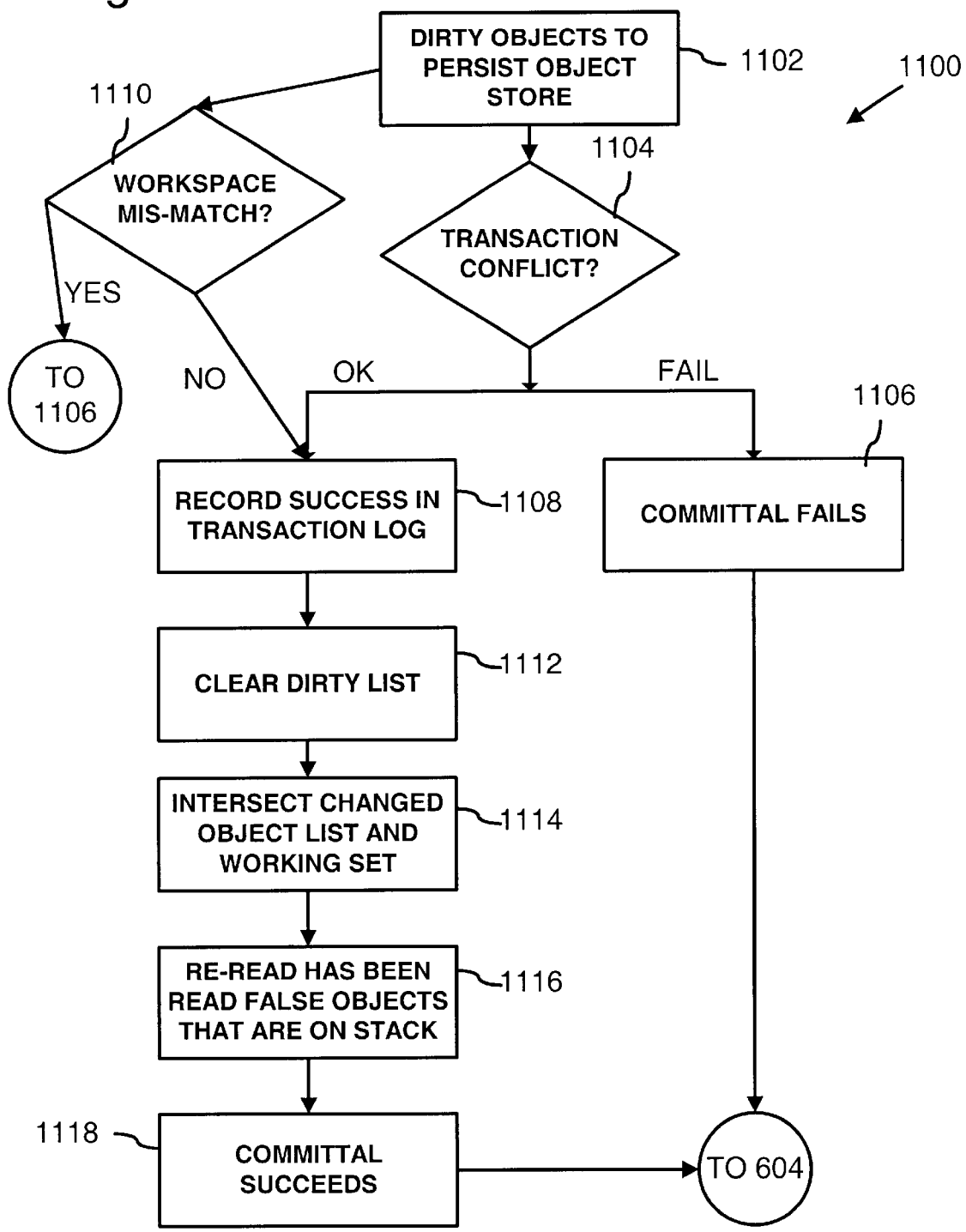
FIG. 11 is a flow diagram of a commit process for committing a transaction so it is recorded or stored in a persistent object store.

FIG. 11 is a flow diagram of a commit process 1100 for committing a transaction so it is recorded or stored in persistent object store 312 as one or more new or modified persistent objects, as referenced at process step 508 in FIG. 5. Committal of a transaction either succeeds or fails for all objects in the transaction. Transactions are not permitted to be partly committed.

Process block 1102 indicates that temporary objects identified in the modified object (i.e., dirty) list, and objects referenced by the listed temporary objects, are copied to persistent object store 312. In addition, the changes in these objects are written to a transaction log 318. This "flushes" the dirty list and provides transitive closure on the modified objects. The commit stores new current states for the persistent objects. After step 1118, the previous states of persistent objects will be eventually reclaimed by the persistent garbage collector 324 after no other transaction begin points reference it.

Query block 1104 represents an inquiry as to whether there are any conflicts with committing the transaction. A conflict can arise, for example, if an object to be recorded for the current transaction is based upon a persistent object that has been changed (e.g., by another user) since the current transaction began. For example, persistent object manager 308 can perform this inquiry by maintaining and referring to a changed object list that lists persistent objects that have been changed. Whenever there is a conflict, query block 1104 proceeds to process block 1106. Whenever there is not a conflict, query block 1104 proceeds to process block 1108.

Process block 1106 indicates that the committal fails. As a result no changes are made to persistent objects in the persistent object store 312 and no newly created temporary objects are recorded in the persistent object store 312. An indication of notice of the failure of the commit is made for the user. Process block 1106 returns to process block 604.

Process block 1108 indicates that a successful committal of the transaction to the persistent object store 312 is recorded in a transaction log 318. As of completion of this step, the committal of the transaction to the persistent object store 312 is durable.

Query block 1110 represents an inquiry as to whether a temporary object in the dirty list is identified with a workspace other than the workspace with which the dirty list is identified. Whenever a temporary object in the dirty list is identified with a workspace other than the workspace with which the dirty list is identified, query block 1110 returns to process block 1106. Whenever a temporary object in the dirty list is not identified with a workspace other than the workspace with which the dirty list is identified, query block 1110 returns to process block 1108.

Process block 1112 indicates that the dirty list for workspace (and hence the transaction) is cleared.

Process block 1114 indicates that an intersection is determined between the changed objects list and the working set of temporary objects that are based on persistent objects and are referenced within the workspace. The intersection result identifies the subset of objects in the working set that have been modified by other transactions that committed during this transaction. For each object in this intersection result, the hasBeenRead indicator is cleared (set to false). The changed objects list is computed by persistent object manager 308 working in cooperation with transaction monitor 316.

Process block 1116 indicates that each temporary object O whose identifier is currently on a Java stack and for which O.hasBeenRead is equal to false is re-read from the persistent object store 312, as described with reference to transactional object get process 800.

Process block 1118 indicates that the committal succeeds. An indication of notice of the success of the commit may be made for the user. Process block 1118 returns to process block 604.

Commit process 1100 is described generally with reference to a transaction. The following pseudo-code illustrates how steps 1102, 1112, and 1110 of the commit process 1100 may be applied for each field f in each object O in the dirty list so as to implement the transitive closure.

```
For each field f in O where {
    f is of type Object {
        if value v of f is a temporary object ID{
            if v.wksld != invalid and
                v.wksld!=this wksld{
                then signal excepetion
            }
            v.wksld = this wksld
            allocate new persist obj ID for v
            add v to dirty list
            value of f = persist obj ID
        }
    }
}
copy O to persistent obj store
O.dirty = false
remove O from dirty list
```

Figure 12:
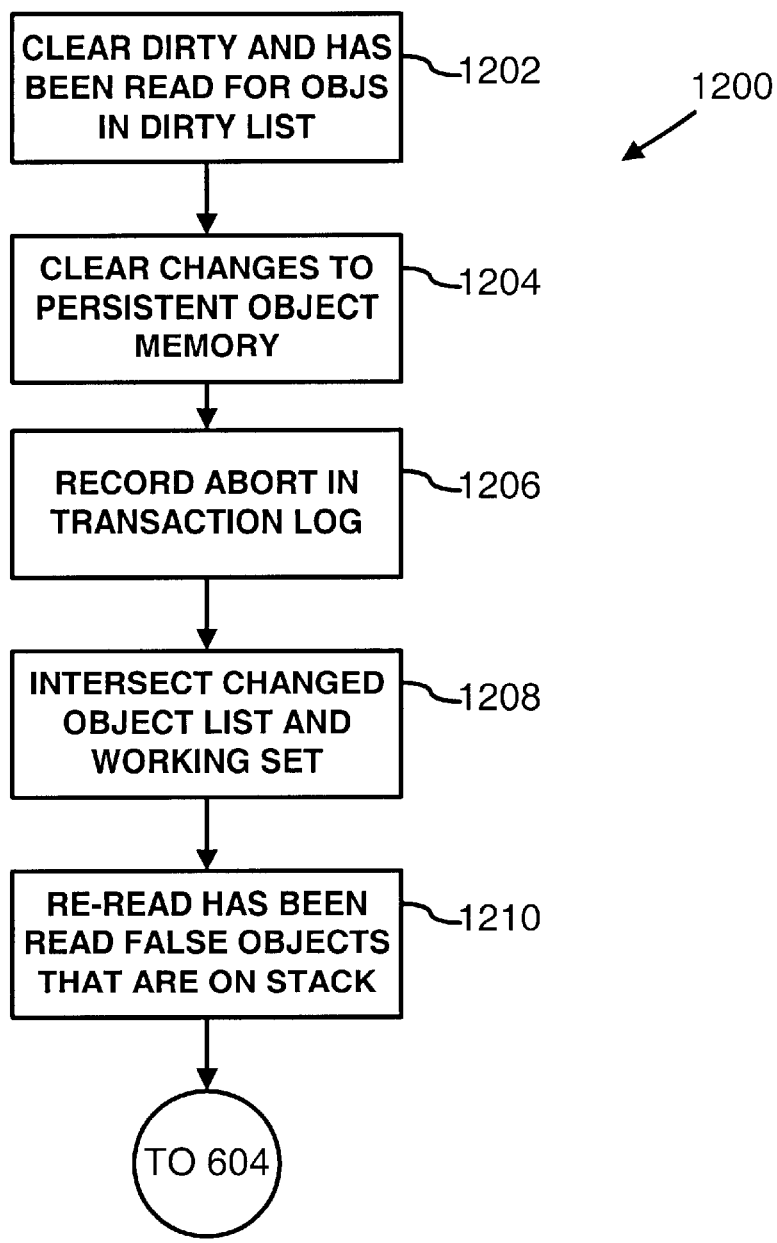
FIG. 12 is a flow diagram illustrating aborting of a transaction without modifying objects within a persistent object store.

FIG. 12 is a flow diagram illustrating aborting of a transaction without affecting objects within persistent object store 312, as referenced at process step 510 in FIG. 5.

Process block 1202 indicates that the dirty indicator 910 and the has been read indicator 908 is cleared for each object in the modified object (i.e., dirty) list. This may be represented as clearing O.dirty and O.hasBeenRead. Then the dirty list is set to empty.

Process block 1204 indicates that any changes stored or flushed in or to persistent object store 312 and shared object cache 314 by this workspace are cleared.

Process block 1206 indicates that the abort is recorded in a transaction log 318.

Process block 1208 indicates that an intersection is determined between changed object list and the working set of temporary objects that are based on persistent objects and are referenced within the workspace. This intersection identifies the objects that have been modified by other transactions that committed during this transaction.

Process block 1210 indicates that for each temporary object O whose identifier is currently on a Java stack, and for which O.hasBeenRead is equal to false, that object O is re-read from the persistent object store 312, as described with reference to transactional object get process 800. Process block 1210 returns to process block 604.

Garbage collector 323 will in due course remove the temporary objects for the aborted transaction. In an alternative implementation, abort process 1200 could be could be substituted for with a simple transaction abort step that removes the objects in the selected workspace (i.e., the working set of objects) upon the transaction abort selection. While seemingly efficient, such a simple transaction abort step in practice often requires greater system resources than abort process 1200 because of the number of transactional methods that continue execution rather than exit after being aborted.

The transactional database aspects of the present invention are applicable to a wide variety of applications. Several exemplary applications are described for purposes of illustration.

In a customer service application for an electric utility, employees answer phone calls from customers who are reporting problems with electric service. The client user interface displays customer account and customer location information to so the employee can write a trouble ticket that describes the nearest lines, transformers, etc. The shared database needs to accumulate and dispatch the trouble tickets and provide customer account and customer location related location or geographic map information.

In a derivatives trading system, a client machine runs a mathematical modeling program which needs to record trading decisions and retrieve historical information from a shared database.

In a semiconductor fab control system, clients include both user interfaces providing human beings with query and update access to various parts of the manufacturing process, as well as unattended computer-controlled machines that record information in the database. Examples of information that is maintained in the database include a recordings of which wafers have completed particular processing steps, recordings of test results for process monitoring measurements from the wafers, recordings of measurements of temperature/time/concentrations of reagents that occurred during a processing step, etc. Such a database can contain accurate work-in-progress, machine scheduling, and historical production records for an entire factory.

The descriptions of virtual machines according the present invention have been directed to server virtual machines in a three-tier transactional database environment. While it has been illustrative of many aspects of the invention, a transactional database environment is not the only environment in which this invention can be applied. Similarly, it will be appreciated that while a server virtual machine illustrates the benefits and functionality of multiple workspaces multiple views of persistent objects, client virtual machines can also benefit from multiple workspaces and multiple views of persistent objects.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. In a computer that executes computer software conforming to an operating system, a software virtual machine computer that runs on the computer and functions as a separate computer that executes virtual machine software not conforming to the operating system, the improvement comprising:

plural transaction workspaces that are within the software virtual machine and operate to execute separate virtual machine software concurrently on the software virtual machine, the software virtual machine being in data communication with and providing client services to plural client computers; and the virtual machine software operating on virtual machine data objects within one or more of the transactional workspaces and the virtual machine data objects being available to be operated on by client services provided by the software virtual machine for plural ones of the client computers, wherein the virtual machine data objects include persistent data objects held in a persistent object store and the virtual machine provides atomic committal of transactions and consistent views of the objects.

2. The computer of claim 1 in which the operating system includes plural threads and the plural transaction workspaces are orthogonal to the plural threads.

3. The computer of claim 1 in which each virtual machine data object includes a workspace identifier that uniquely identifies the transaction workspace within which the virtual machine data object is operated on from among the plural transaction workspaces on the virtual machine.

4. The computer of claim 1 in which each transaction workspace provides client services to only one of the client computers at a time.

5. The computer of claim 1 in which the virtual machine provides plural concurrent consistent views of the objects in plural ones of the transactional workspaces.

6. In a computer-readable medium having stored thereon a temporary object of a persistent transactional data object for a virtual machine computer, the temporary object having a data structure for identifying the temporary object, the data structure comprising:

a workspace identifier that identifies one of plural transaction workspaces in the virtual machine computer within which workspace the temporary object is operated on, wherein the temporary object corresponds to a persistent object held in a persistent object store, and the data structure further comprises an object modification indicator that indicates whether the temporary object has been modified from the persistent object.

7. The data structure of claim 6 in which the data structure further comprises a persistent object identifier that identifies the persistent object to which the temporary object corresponds.

8. In a computer-readable medium having stored thereon a temporary object of a persistent transactional data object for a virtual machine computer, the temporary object having a data structure for identifying the temporary object, the data structure comprising:

a workspace identifier that identifies one of plural transaction workspaces in the virtual machine computer within which workspace the temporary object is operated on, wherein the temporary object corresponds to a persistent object held in a persistent object store, the data structure further comprising an object read indicator that indicates whether the temporary object has been copied from the persistent object since a predetermined event.

9. The data structure of claim 8 in which transactions in the transaction workspace may be aborted or committed and the predetermined event is a transaction abort or a transaction commit.

10. The data structure of claim 8 in which the data structure further comprises an object modification indicator that indicates whether the temporary object has been modified from the persistent object and a persistent object identifier that identifies the persistent object to which the temporary object corresponds.

11. In a computer-readable medium having stored thereon a temporary object of a persistent transactional data object for a virtual machine computer, the temporary object having a data structure for identifying the temporary object, the data structure comprising:

a workspace identifier that identifies one of plural transaction workspaces in the virtual machine computer within which workspace the temporary object is operated on, wherein the temporary object corresponds to a persistent object held in a persistent object store, the data structure further comprising an object modification indicator that indicates whether the temporary object has been modified from the persistent object and an object read indicator that indicates whether the temporary object has been copied from the persistent object since a predetermined event.

12. The data structure of claim 11 further comprising a persistent object identifier that identifies the persistent object to which the temporary object corresponds.

13. In a virtual machine computer software on a computer-readable medium for providing a virtual machine computer on a computer that executes computer software conforming to an operating system, the virtual machine computer functioning as a separate computer that executes virtual machine software not conforming to the operating system, the improvement comprising:

a get object field software instruction that creates in a transaction workspace a copy of a persistent object and assigns a workspace identifier to the copy.

14. The software of claim 13 in which the persistent object includes a persistent object identifier and the get object field software instruction assigns the persistent object identifier to the copy.

* * * * *